US007023811B2

(12) United States Patent
Pinto

(10) Patent No.: US 7,023,811 B2
(45) Date of Patent: Apr. 4, 2006

(54) SWITCHED FABRIC NETWORK AND METHOD OF MAPPING NODES USING BATCH REQUESTS

(75) Inventor: Oscar P. Pinto, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 09/760,661

(22) Filed: Jan. 17, 2001

(65) Prior Publication Data

US 2002/0133622 A1 Sep. 19, 2002

(51) Int. Cl.
*H04L 12/28* (2006.01)
(52) U.S. Cl. .................. 370/254; 370/351; 370/390; 370/400; 709/220; 709/223; 709/235; 709/242; 710/316
(58) Field of Classification Search .............. 709/242, 709/238, 201, 220, 221, 223, 224, 235, 241, 709/245, 239; 370/351–356, 389, 390, 392, 370/400, 902, 218, 230, 254–258, 278, 401, 370/410, 432, 393, 408; 710/316; 340/2.1, 340/825.01
See application file for complete search history.

(56) References Cited

U.S. PATENT DOCUMENTS

| | | | | |
|---|---|---|---|---|
| 6,041,049 A | * | 3/2000 | Brady ........................ | 370/351 |
| 6,047,330 A | * | 4/2000 | Stracke, Jr. ................. | 709/238 |
| 6,188,675 B1 | * | 2/2001 | Casper et al. ............... | 370/254 |
| 6,400,281 B1 | * | 6/2002 | Darby et al. ................ | 340/933 |
| 6,538,991 B1 | * | 3/2003 | Kodialam et al. .......... | 370/229 |
| 6,748,559 B1 | * | 6/2004 | Pfister et al. ................ | 714/56 |
| 6,791,948 B1 | * | 9/2004 | Desnoyers et al. ......... | 370/254 |
| 2001/0024434 A1 | * | 9/2001 | Ayyagari et al. | |
| 2003/0005092 A1 | * | 1/2003 | Nelson et al. .............. | 709/220 |
| 2003/0195983 A1 | * | 10/2003 | Krause | |
| 2003/0217125 A1 | * | 11/2003 | Brancati et al. ............ | 709/220 |
| 2004/0218548 A1 | * | 11/2004 | Kennedy et al. ........... | 370/254 |
| 2004/0218582 A1 | * | 11/2004 | Kennedy et al. ........... | 370/351 |
| 2005/0075075 A1 | * | 4/2005 | Wechter et al. ........... | 455/67.11 |

OTHER PUBLICATIONS

Pearlman, M.R. et al., "Using multi-hop acknowledgements to discover and reliably communicate over unidirectional links in ad hoc networks", IEEE Wireless Communications and Networking Conference, vol. 2, Sep. 23-28, 2000, pp. 532-537.*
Lansdowne, Z.F., "A stopping rule for link failure detection", IEEE Transactions on Communications, vol. 41, Issue: 4, Apr. 1993, pp. 528-530.*

* cited by examiner

*Primary Examiner*—Anthony Knight
*Assistant Examiner*—Crystal J. Barnes
(74) *Attorney, Agent, or Firm*—Schwegman, Lundberg, Woessner & Kluth, P.A.

(57) ABSTRACT

A method for discovering and mapping elements in a subnet of a data network fabric. A single data packet may be sent from a subnet manager and broadcast by switches to other elements. Every time the packet is copied and forwarded, the identifier of the element and the node it passes through are recorded. Replies are generated when the packets reach end nodes or are received a second time at a switch. The use of specific node inport identifier in the packet speeds the process and avoids duplication. A batch request may also be utilized in conjunction with the broadcast so that multiple requests can be processed by the nodes at the same time.

12 Claims, 10 Drawing Sheets

EXAMPLE SOFTWARE DRIVER STACKS OF HOST SYSTEM

SWITCHED FABRIC NETWORK AND METHOD OF MAPPING NODES USING BATCH REQUESTS

TECHNICAL FIELD

The present invention relates to a data network, and more particularly, relates to a switched fabric network which uses batch requests to map the nodes of the network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corporation to provide a standards-based I/O platform that uses a switched fabric and separate I/O channels instead of a shared memory-mapped bus architecture for reliable data transfers between end-nodes, as set forth in the "*Next Generation Input/Output (NGIO) Specification,*" NGIO Forum on Jul. 20, 1999 and the "*InfiniBan™ Architecture Specification,*" the InfiniBand™ Trade Association scheduled for publication in late October 2000. Using NGIO/InfiniBand™, a host system may communicate with one or more remote systems using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain work queues (WQ) formed in pairs including inbound and outbound queues in which requests, in the form of descriptors, are posted to describe data movement operation and location of data to be moved for processing and/or transportation via a data network. Each host system may serve as a source (initiator) system which initiates a message data transfer (message send operation) or a target system of a message passing operation (message receive operation). Requests for work (data movement operations such as message send/receive operations and remote direct memory access "RDMA" read/write operations) may be posted to work queues associated with a given network interface card. One or more channels between communication devices at a host system or between multiple host systems connected together directly or via a data network may be created and managed so that requested operations can be performed.

However, in this architecture it is necessary for each part of the fabric to have an understanding of the nodes that are present therein. In the current architecture, this procedure is very time consuming and requires a lot of bandwidth. Accordingly, there is a need to provide a method for mapping the nodes of each subnet in the fabric in a fashion which is quick and requires a minimum of bandwidth.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
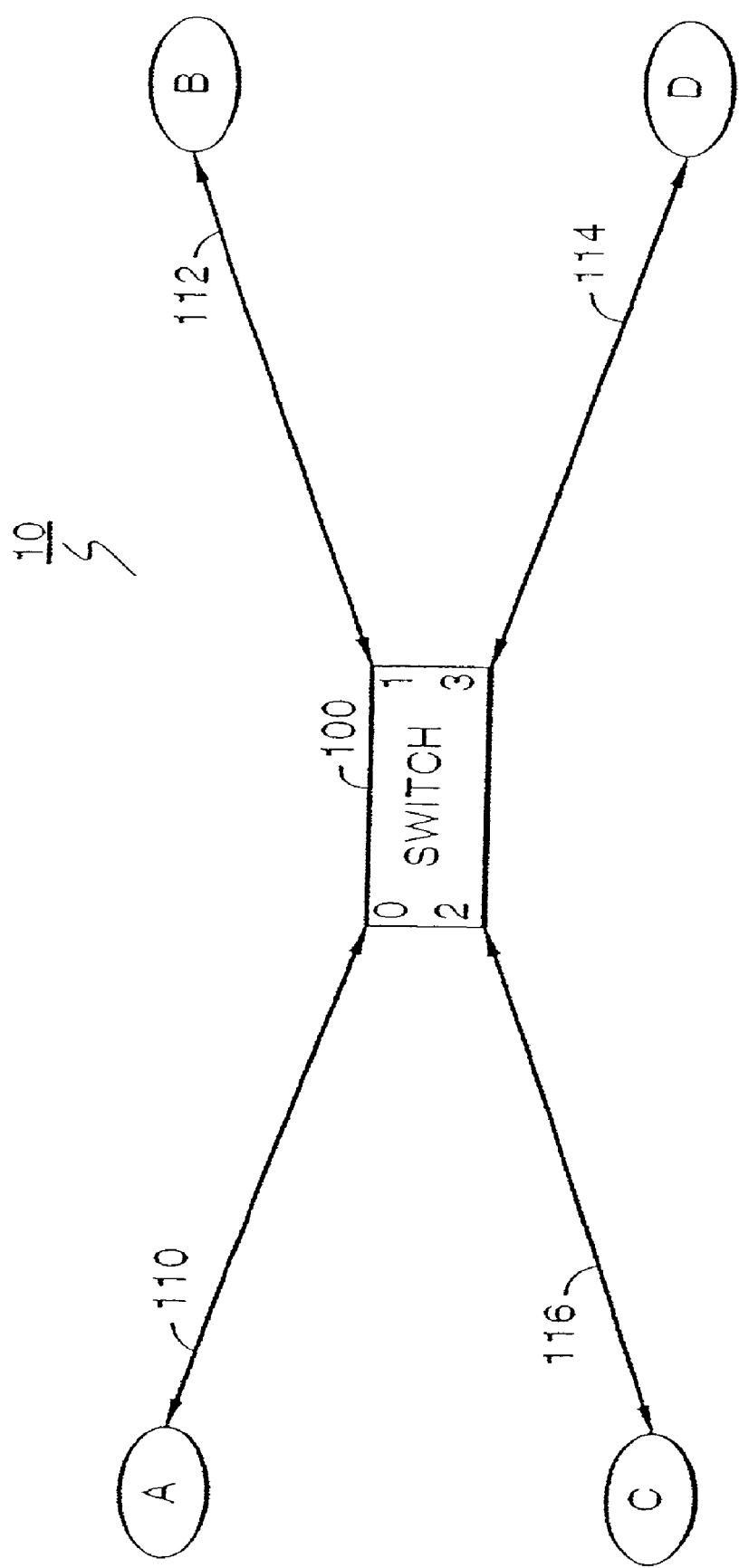
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO)*

*Specification*" as set forth by the NGIO Forum on Jul. 20, 1999, and the "*InfiniBand™ Architecture Specification*" as set forth by the InfiniBandi™ Trade Association on late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999, and/or the *InfiniBand™ Specification* for enabling the endpoints (nodes) to communicate to each other over an NGIO/InfiniBand™ channel(s).

Figure 2:
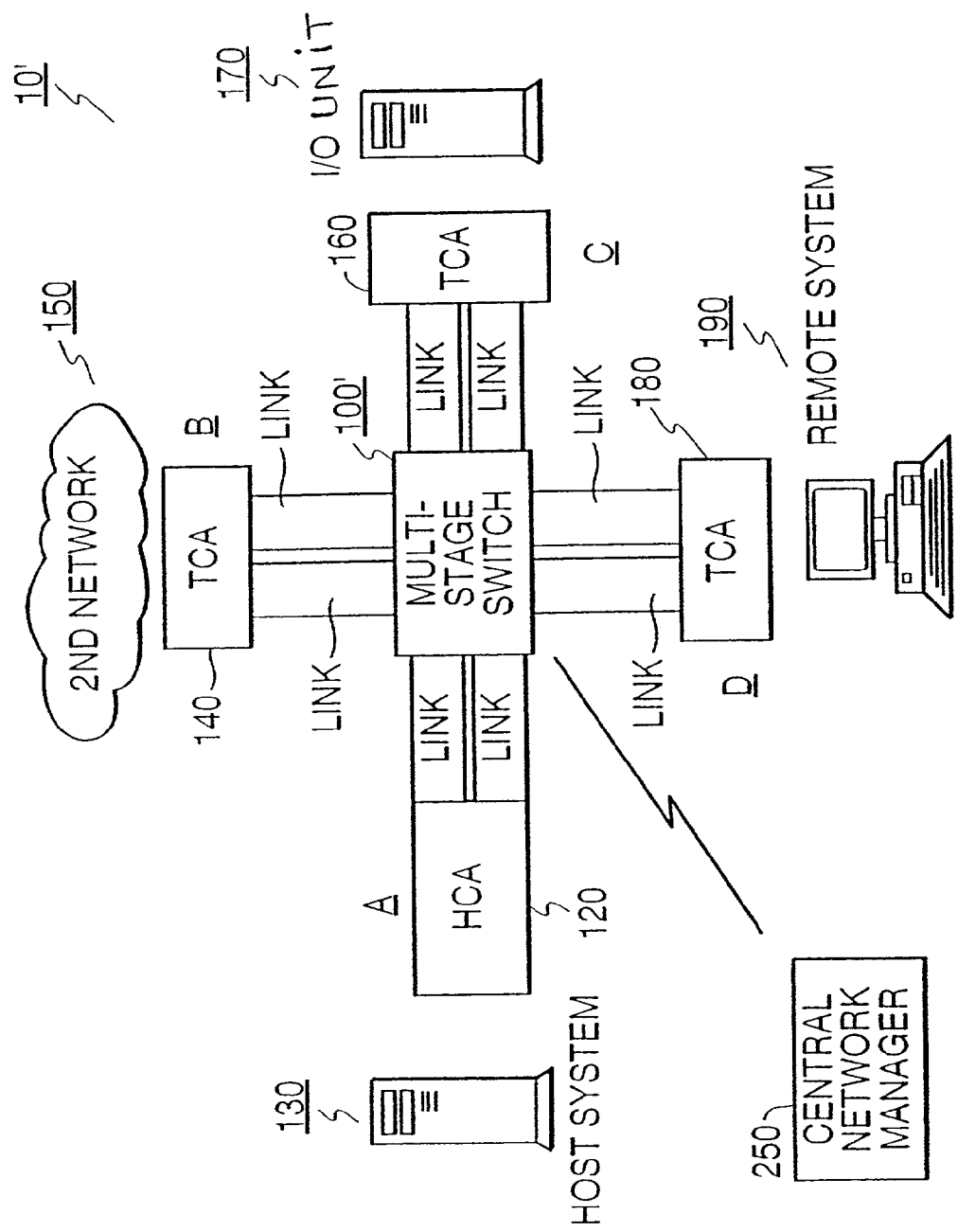
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of cells between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBand-ta.org."

Figure 3:
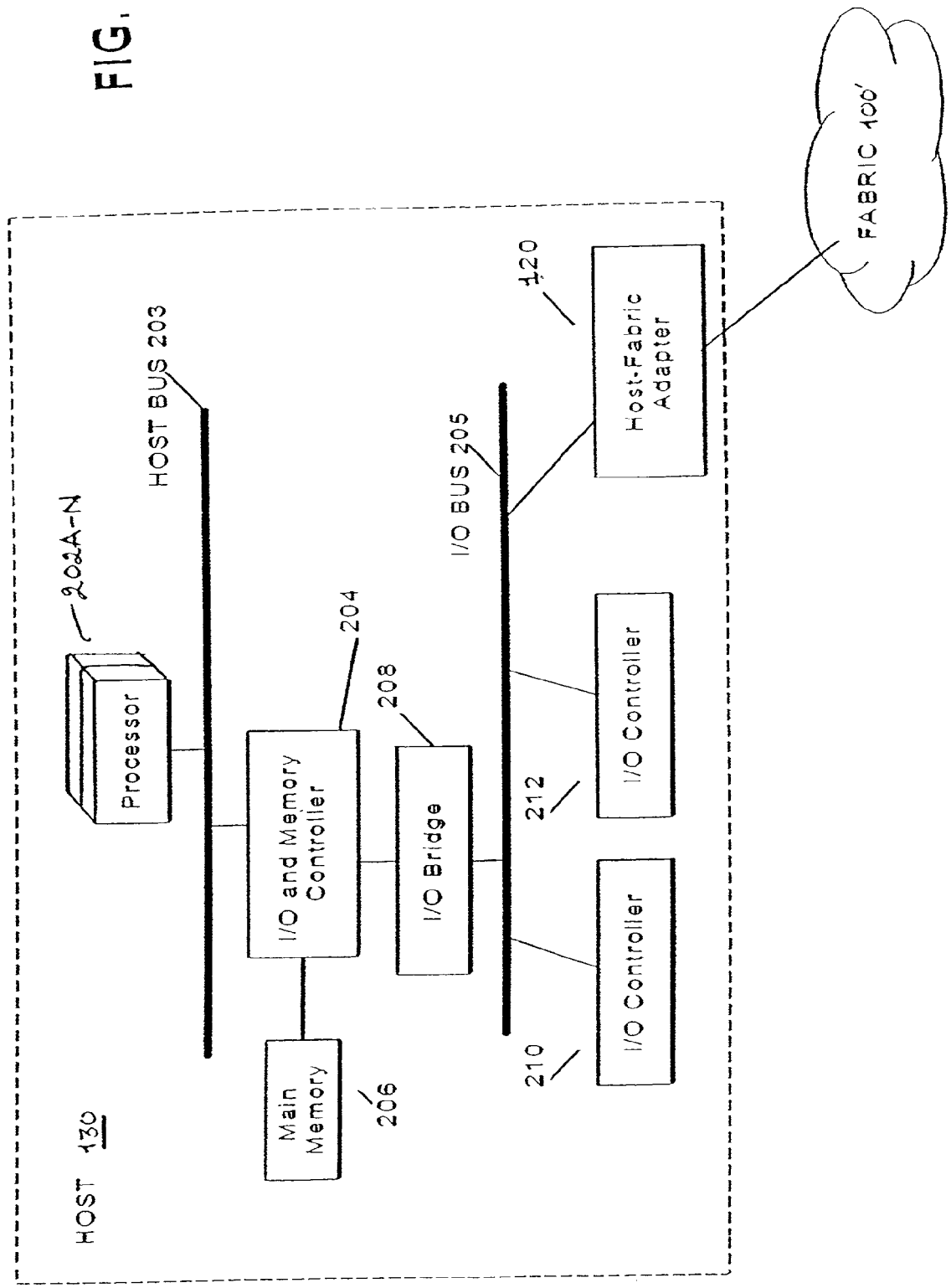
FIG. 3 illustrates a block diagram of an example host system of an example data network according to an embodiment of the present invention.

Returning to discussion, one example embodiment of a host system 130 may be shown in FIG. 3. Referring to FIG. 3, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4:
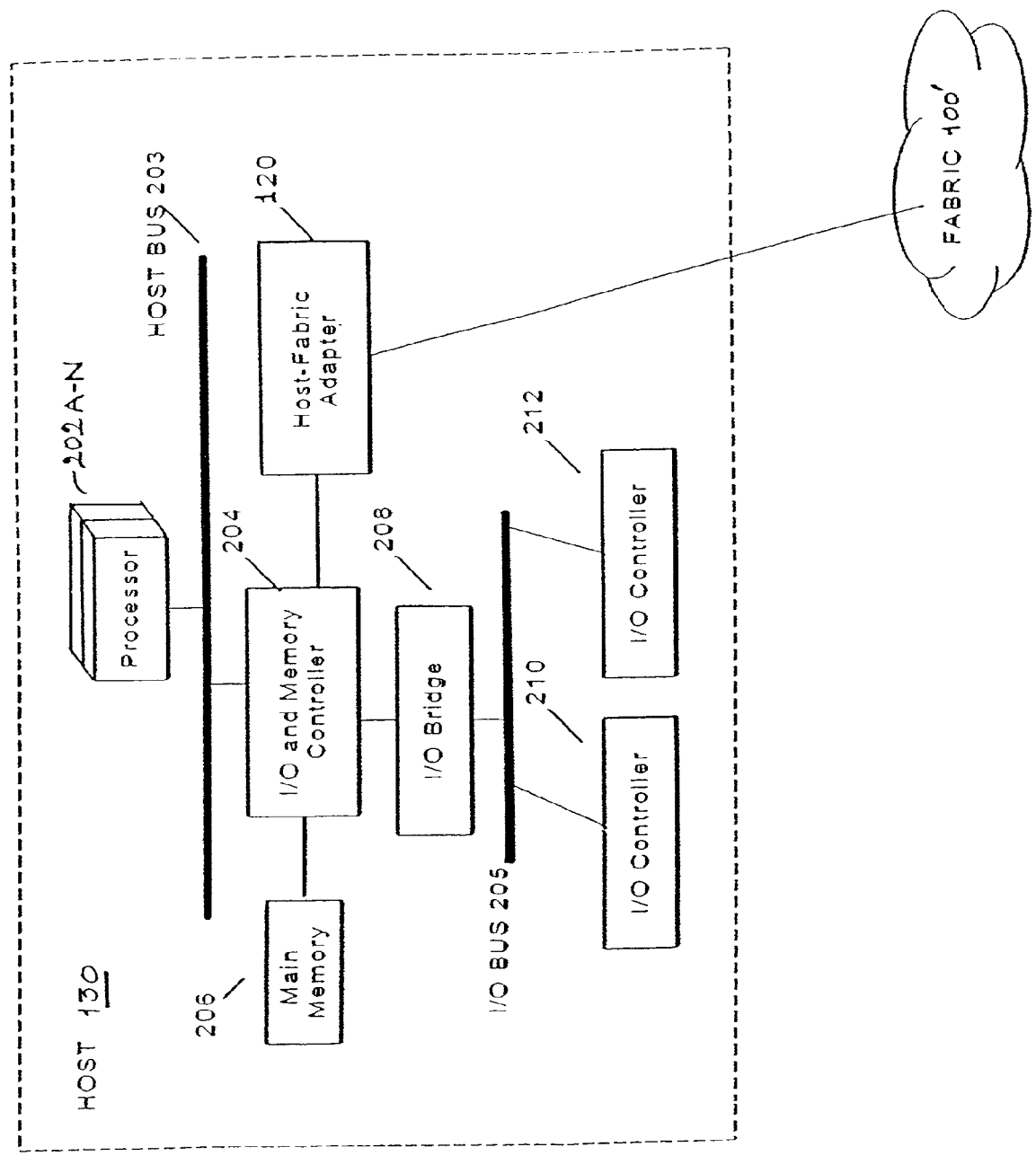
FIG. 4 illustrates a block diagram of an example host system of an example data network according to another embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment shown in FIGS. 3–4, one or more host-fabric adapters 120 may be provided to interface the host system 130 to the NGIO switched fabric 100'.

FIGS. 3–4 merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the switched fabric 100', while preferably being compatible with many currently available operating systems, such as Windows 2000.

Figure 5:
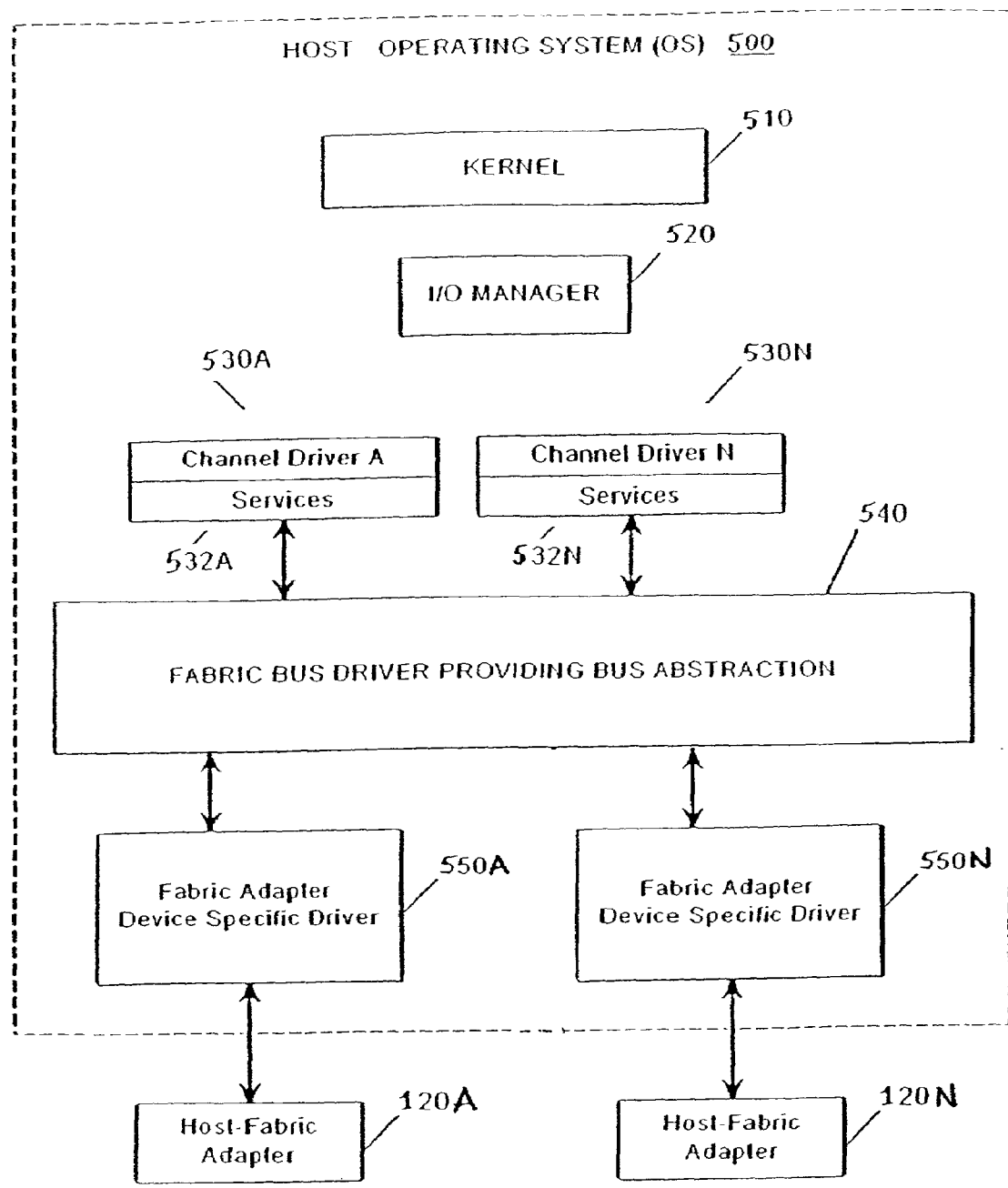
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate I/O requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive I/O transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (HCA) driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*", the "*Next Generation I/O: Intel HCA Con-* nection Services Layer High Level Design", the "Next Generation I/O: Intel HCA Abstraction Layer High Level Design", and the "Next Generation I/O: Intel HCA Fabric Services Layer High Level Design" as set forth by Intel on Aug. 6,1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the send or receive work queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version 1.0,*" as set forth by Compaq Corp., Intel Corp., and Microsoft Corp., on Dec. 16, 1997. VI architecture may support data transfers between two memory regions, typically on different systems over one or more designated channels of a data network. Each system using a VI Architecture may contain work queues (WQ) formed in pairs including inbound (receive) and outbound (send) queues in which requests, in the form of descriptors, are posted to describe data movement operation and location of data to be moved for processing and/or transportation via a switched fabric 100'. The VI Specification defines VI mechanisms for low-latency, high-bandwidth message-passing between interconnected nodes connected by multiple logical point-to-point channels. However, other architectures may also be used to implement the present invention.

Figure 6:
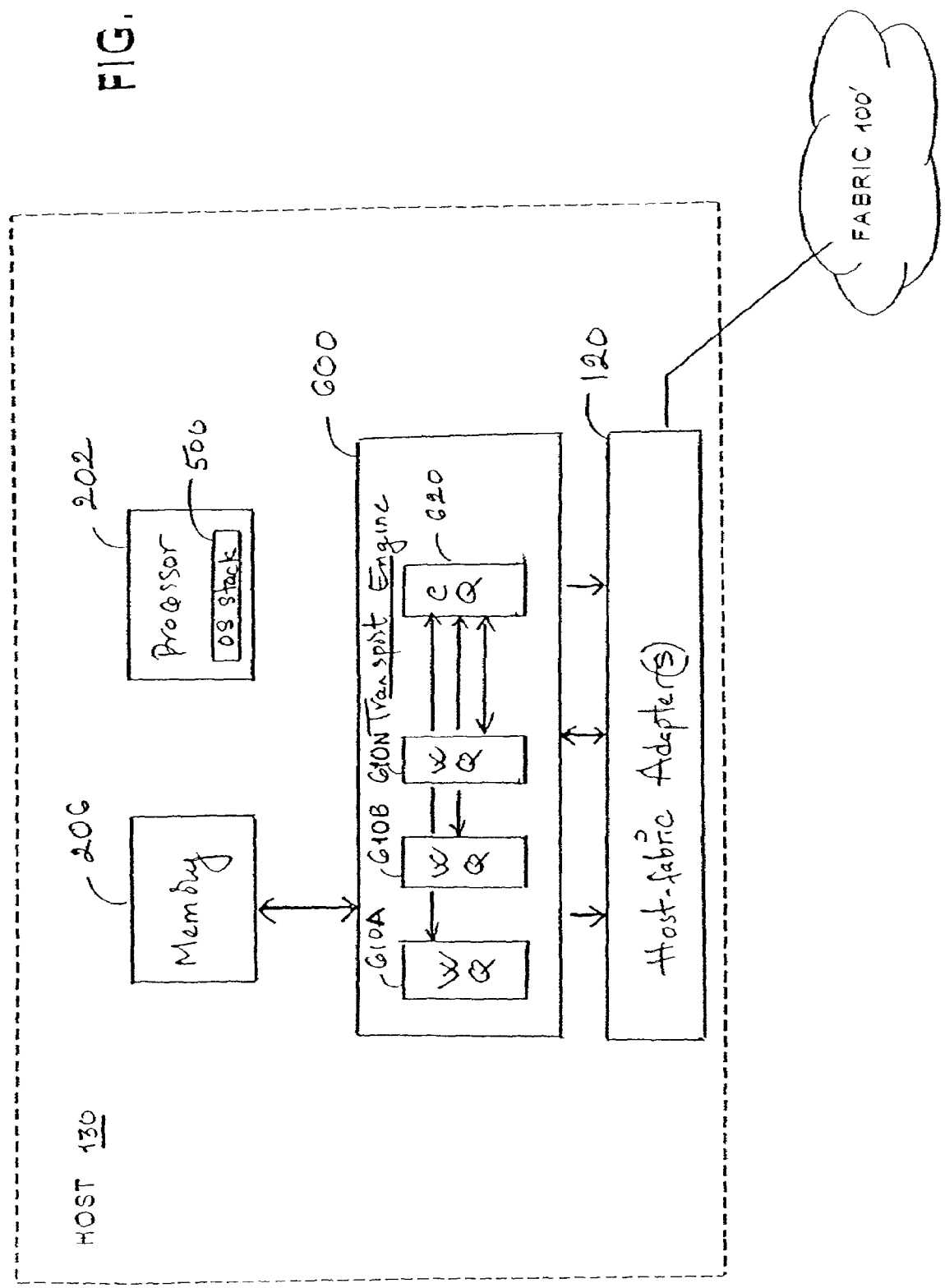
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 3–5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound (receive) and outbound (send) queues, such as work queues (WQ) 610A–610N in which requests, in the form of descriptors, may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). In one embodiment, each work queue pair (WQP) including separate inbound (receive) and outbound (send) queues has a physical port into a switched fabric 100' via a host-fabric adapter (HCA) 120. However, in other embodiments, all work queues may share physical ports into a switched fabric 100' via one or more host-fabric adapters (HCAs) 120. The outbound queue of the work queue pair (WQP) may be used to request, for example, message sends, remote direct memory access "RDMA" reads, and remote direct memory access "RDMA" writes. The inbound (receive) queue may be used to receive messages.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented I/O services. Requests for work (data movement operations such as message send/receive operations and RDMA read/write operations) may be posted to work queues (WQ) 610A–610N associated with a given fabric adapter (HCA), one or more channels may be created and effectively managed so that requested operations can be performed.

Figure 7:
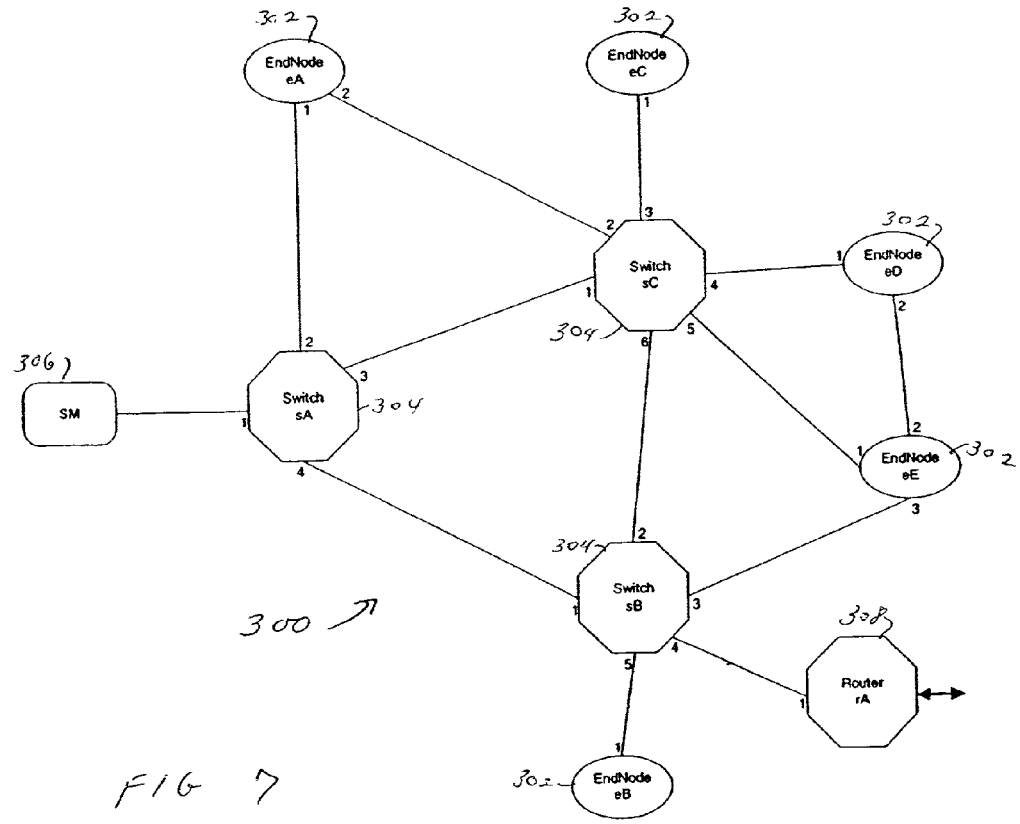
FIG. 7 illustrates an example diagram of an example subnet in an advantageous arrangement of the present invention.

The data network described above as a fabric may also be subdivided into subnets. These subnets are connected together to form the entire fabric as described. Such a subnet 300 is shown in FIG. 7. This subnet includes five end nodes 302 and three switches 304. As described above, these switches are used to interconnect the end nodes for data transfer. The subnet is connected to other subnets and the fabric in general through a router 308. Thus, the size of the fabric can be quite large as additional subnets are connected through additional routers. The subnet also contains a subnet manager 306 which has certain responsibilities for managing the subnet to which it is connected. It is also possible that a subnet will have more than one subnet manager, depending on size and if so, only one will be declared the master subnet manager. The subnet manager may be a separate entity, as shown, or may be part of one of the other devices. It is the job of the subnet manager to control the operation of the subnet. In particular, one main job of the manager is to keep track of the elements in the subnet to assign identifying numbers to the element and to make arrangements for data switching within the subnet. One very important job of the manager is to determine the configuration of the subnet when it is first activated. Each element in the fabric is given an identifier. Each port within that element is also given a local identifier number. It is thus possible to identify every element and every port within the fabric by alpha numeric identifiers. For convenience of discussion, the end nodes of FIG. 7 are indicated by e followed by A–E, respectively. Each switch is indicated a s followed by A–C respectively. The port number of these elements is indicated by a—followed by the port number of that element. When the subnet is activated, the subnet manager assigns these names and port numbers. The specific data connections between two ports can similarly be indicated by listing the identifiers of the ports at either end of the data path.

When the subnet is activated, such as when the system is first turned on, the subnet manager sends subnet management packets, which are programmed instructions, to the various elements in its subnet. These packets poll the elements to determine their location so that the subnet manager can map the elements in its respective subnet. It also then assigns identification numbers to the elements. A special routing mode know as directed routing has been used for this purpose since local identification has not yet been established nor the configuration of the subnet. The manager walks its way through the fabric sending packets to a device and discovering if it is a switch or an end node. If it is a switch, packets can then be sent out of each of the ports to discover which devices are connected to that switch. After the manager discovers all of the elements and how they are interconnected it then assigns local identification numbers and configures routing tables for the switches. Thus, each switch will know how to forward a message which is assigned to a specific end node. Once these tables are established, messages can be sent using destination routing, or merely by indicating which end node the message is being sent to. The tables will determine the actual route. Once the subnet is active, this procedure will periodically be reactivated to see if any changes have been made to the subnet.

While this system of discovering the subnet topology is workable, it has several limitations. This type of directed routing is several order of magnitude slower than normal switching. This is due to the fact that each switch along the route has to perform some processing on every direct routed packet. For a large subnet, this time may be large because each node needs to be processed by sending out several signals. Another limitation is that the exact route that a packet will traverse through a subnet is not known until the entire discovery process is finished. The initial and return paths may not be the same and the subnet manager may not know what they mean until the entire discovery process has finished. Another limitation is that each node has to be addressed one at a time to process its properties, to program it and to discover all possible paths to reach it.

The present invention provides a quicker method for performing this function by using a broadcast mechanism. The mechanism can be implemented without any changes to the hardware of the system. This procedure is faster, requires less bandwidth and requires less complexity and processing ability on the part of the subnet manager.

A single packet is sent from the subnet manager which is designed to reach a number of destinations. The distance that this packet can traverse in a subnet is a little limited by the amount of path data that it can hold. The path data consists of the identifying data of the elements and port numbers of the elements that the packet passes through. For example, if the maximum number is fourteen, the packet can reach an end node that is fourteen nodes away from the subnet manager.

This broadcast message is accomplished in the following manner. The subnet manager first formats the packet by setting the management class field to data which indicates a subnet management class directed route using node identifiers with broadcast. The path is initialized to zero and the "hop" count or maximum number of path data available is set as desired. Once the packet is formatted, it is sent from the subnet manager into the subnet.

If a switch receives this packet and if the hop pointer is not equal to the hop count, the switch knows it is merely a way point in the path. The switch repeats the packet to all of its ports except for the one in which it arrived. It then inserts in the path information, its own identifier and the port number on which it arrived and the port number on which it is being sent out. The hop count is increased since the packet has now traversed an additional element and the packet is sent on.

If a switch receives a packet where the hop pointer is equal to the hop count, it receives the packet and processes it. The processing is similar to the present method. It will place its identifier and port number from which the packet arrived into the packet and output it from the same port in which it arrived.

An end node receives the packet, it is processed as a switch would process it above. The actual information that goes into data fields will be processed as applicable for such nodes. Since this is an end node, it does not broadcast the packet further as a switch does.

If the switch receives a packet that contains its own identifier in the path it becomes an end point for the packet. This helps the manager to discover all known paths through the switch. The switch then replies back in the same manner as when the hop pointer equals the hop count.

The maximum distance the packet can travel is only limited by the size of the field in which the paths can be stored. The subnet manager can successfully and effectively discover the topology of the subnet as well as reach all nodes. Since the broadcast mechanism gives the effect of ripples, the process can be treated the same way, with nodes around the manager being the first to complete discovery processed. When the hop count has reached its maximum possible value, all paths are discovered and hence switches can be programmed with forwarding table information and local identifiers. If there are nodes in the subnet that fall beyond the maximum number of hops possible, this information can then be used to further map these nodes by starting from the last switch that has been programmed and repeating the process.

Figure 8:
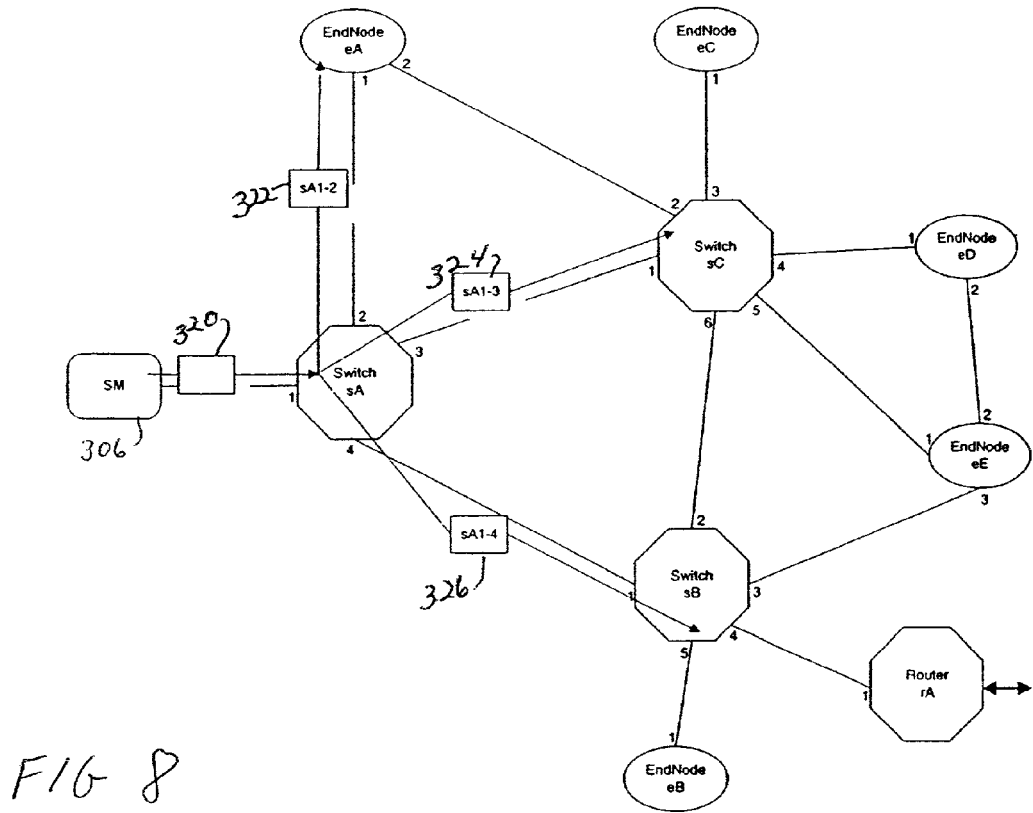
FIGS. 8–12 illustrate examples of the example subnet of FIG. 7 with packets of data being carried therethrough according to an advantageous arrangement of the present invention.

FIG. 8 shows the first step in the process of broadcasting the packet. The manager 306 sends the packet 320 to the only switch to which it is connected, switch sA. The switch receives the packet adds its own identifier as well as the number of the node on which the packet was received, i.e. sA1 to the packet, copies the packet and forwards it out each of the other nodes of the switch, after adding the exit node number to each of those new packets. Thus, this is indicated in FIG. 8 where packet 322 includes the designation sA1–2 to designate that it was received at node 1 and exits at node 2 of switch sA. Likewise, packet 324 indicates that it has left at node 3 and packet 326 indicates it has left at node 4. These three new packets are then sent on their way to the adjoining three elements. The first packet reaches end node eA at port 1. The second packet 324 reaches switch sC at port 1. The third packet reaches switch sB at port 1.

Since the first packet reaches an end node rather than a switch, it is not rebroadcast. However, packets 324 and 326 are received by switches sC and sB, respectively. These switches receive the packet, add their own identifier and the number of the port on which it is received, copy it and rebroadcast it from each of its remaining ports after adding that port number to the packet issued at the respective port.

Figure 9:
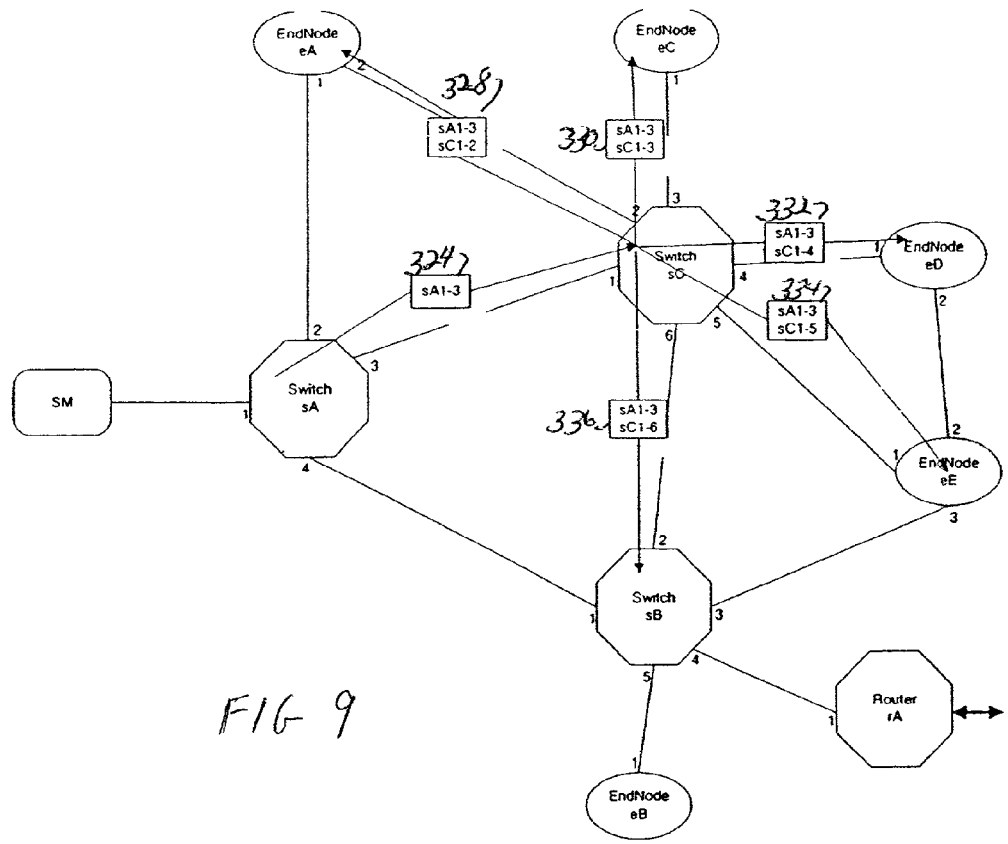

FIG. 9 shows this process in regard to packet 324. The packet is received at port 1 in switch sC. The identifier of the switch and the receiving port sC1 is added to the packet and it is copies five times for rebroadcast from nodes 2–6. The rebroadcast node is also added. Thus, packet 328 indicates that the original packet was sA1–3 and that it was then received at switch sC, at port 1 and rebroadcast from port 2 by including the line sC1–2. In similar fashion, packets 330, 332, 334 and 336 are issued from ports 3, 4, 5 and 6, respectively. Each of these packets indicates the same first line as packet 328 to indicate the source of the original packet and also includes the same first part of line 2 which indicates that the original packet was received in switch sC at port 1. The only difference is that the final number points out which node the second packet was issued from.

A similar process occurs for packet 326 when it is received at switch sB at port 1. The identifier for switch sB in port 1 is added and the packet copied four times for rebroadcast at nodes 2, 3, 4, and 5. The node number is also added at each of those four locations before rebroadcasting.

Figure 10:
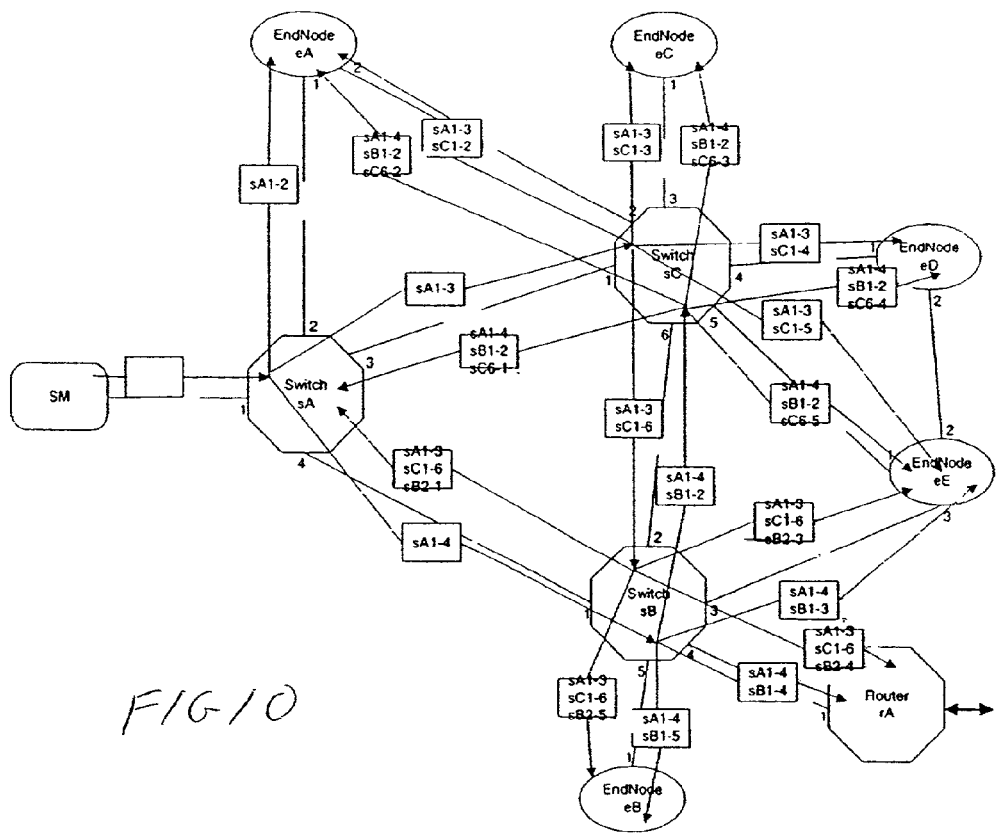

FIG. 10 shows the movement of the packets within the subnet after three hops or data paths. For ease of illustration, the packet numbers are no longer shown. However, it is clear from the lines of data paths indicated on each packet the paths that it has taken. Thus, the original packet 320 and the first rebroadcast set of packets 322, 324 and 326 are shown with the original packet having no identifiers and the other three having a single identifier. The five packets 328–336 which have two data paths and which were shown in FIG. 1 and FIG. 9 are also included. The four packets described immediately above which were rebroadcast from switch sB are also shown the two data paths. Where each of the two data path packets reaches another switch, another packet is generated in the same way. These are indicated in FIG. 10 by packets having three lines of data path identifiers.

This scheme continues under the rules described above until all packets reach an end node or reach a switch which it already has passed through. At this time, the element is considered to be the receiving point and the reply is then generated on the same node from which it is received.

Figure 11:
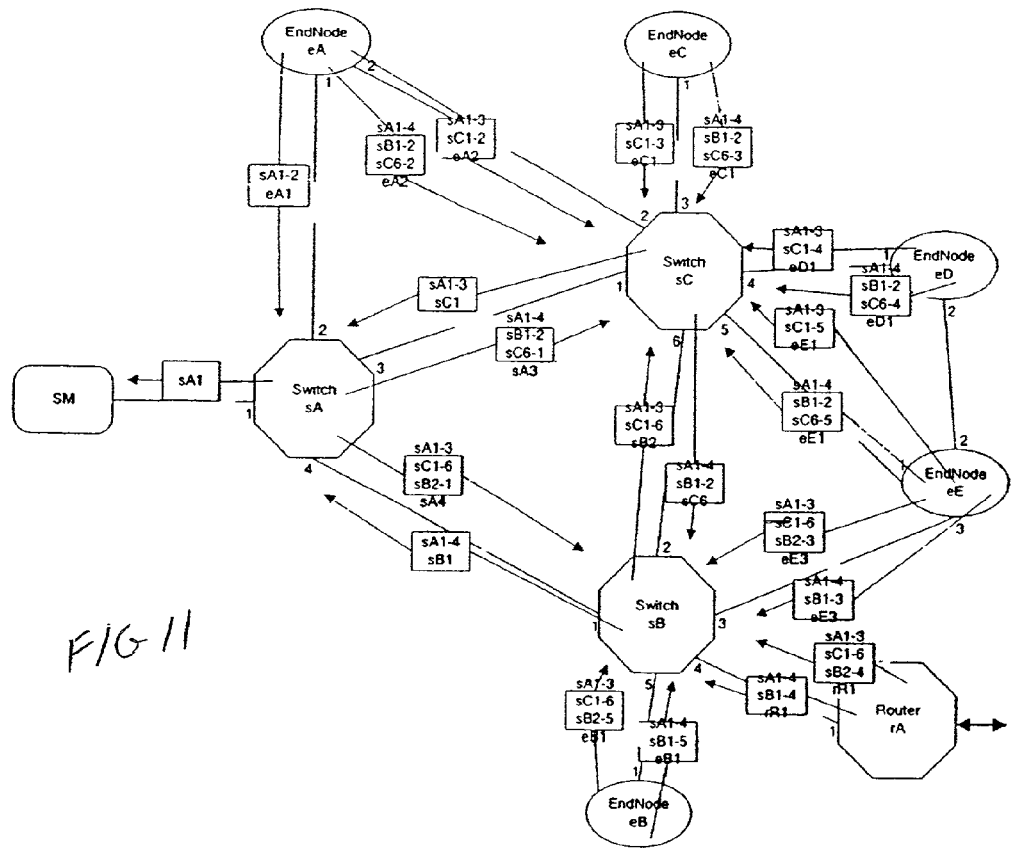

FIG. 11 shows the various replies being generated from the outgoing packet shown in FIG. 10. Thus, one reply is generated by switch sA at port 1 to reply to the original packet 320. End node eA also sends a reply at port 1 in response to packet 322. Likewise, replies to packets 328, 330, 332 and 334 which are broadcast in FIG. 9 are also generated by end nodes eA, eC, eD and eE respectively. Likewise, other replies are generated by the other packets described in FIG. 10. Replies are also generated from packets which reach the router designated as rA. These replies are then returned to the subnet manager so that it may determine all of the paths by which each of the end nodes and switches may be reached. In response to this, a table is establish for each switch for handling messages which pass there through.

Figure 12:
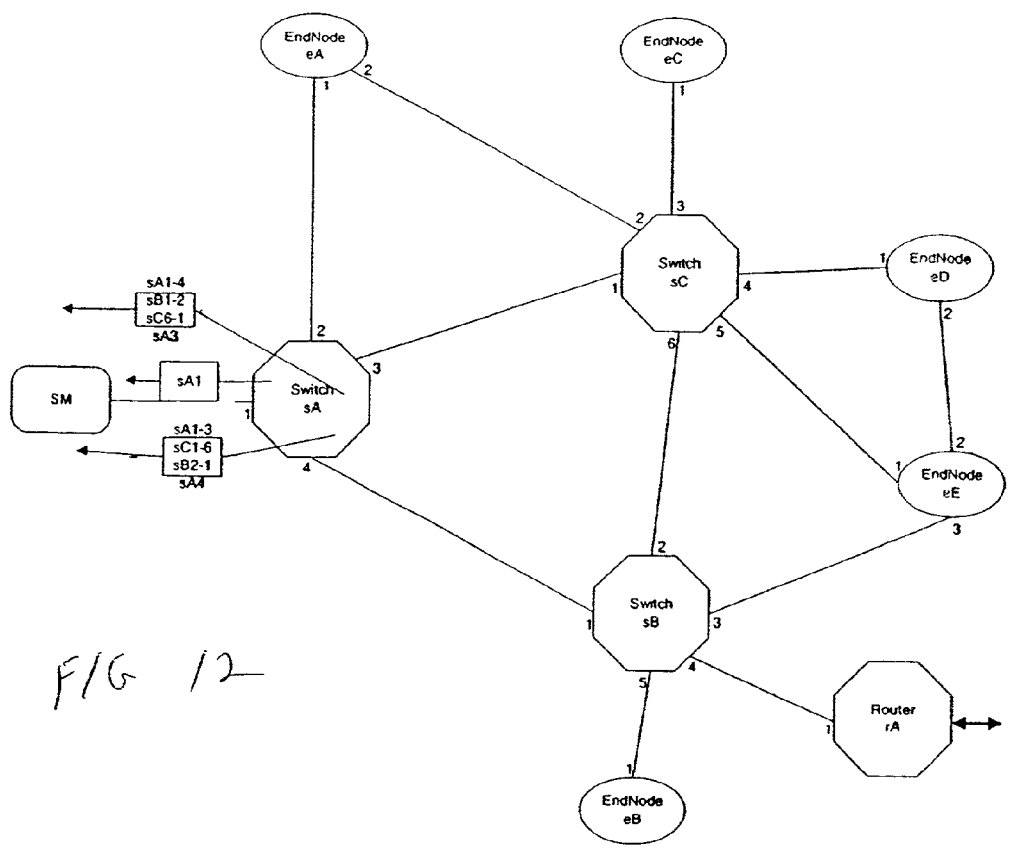

An additional step may also be utilized by a switch when it receives a packet which already contains its identifier in the path list. Rather than sending this packet back through the same port to follow the path backwards to the source, it is possible to shorten the return path by instead sending it out the port and along the path of the first received packet. This is seen in FIG. 12 in regard to switch sA. The first packet that was received at this switch, original packet 320 caused a reply sA1 to be generated. When other packets are received at this same switch which have followed a circuitous around the subnet, it would be shorter to send the reply directly back in the same manner as reply sA1 rather than returning the reply through the same circuitous path. Thus, switch sA has received packets which it originally rebroadcast on nodes 3 and 4 which then went to switches sC and sD, respectively, and then returned to sA through the other switch. In this optimized reply arrangement, switch sA sends a reply directly through port 1 to the subnet manager in the same way that the original reply sA1 was sent rather than sending these two replies back through switches C and B.

Utilizing this broadcasting mechanism, certain benefits are obtained. It is only necessary to generate one original packet to discover all of the nodes, ports and switches. Thus, in the example shown in the figures, one original packet has generated twenty-two replies. Using previous methods, a minimum of twenty-one requests would have been required with about twenty replies. The use of the single source packet shortens the amount of time necessary for discovery procedure. Further, by using this mechanism the way points are concisely identified by the identifiers so that paths once discovered will not be duplicated. The discovery process is completed automatically merely by processing the replies as they are returned. An optimized return may also be utilized to further shorten the return time of the replies.

This discovery procedure can be effected by utilizing the identifiers of the nodes and local identifiers of the ports. By doing this, all possible paths to a node can be discovered because of the manner in which the identifier uniquely identifies the nodes. By using the discovery procedure with node identifier path information, the discovered procedure can uniquely identify any node in a subnet. Also routes may not be repeated and can be shortened at a switch since the whole path information is known. As a result, the maximum hop count will be fourteen which means that the end node may be fourteen nodes away from the subnet manager.

Tables 1, 2 and 3, below describe the formats of the packet used in the discovery process.

TABLE 1

Packet Fields Using Node Identifier to Reference Paths

| OBJECT | LENGTH | DESCRIPTION |
| --- | --- | --- |
| Base Version | 1 byte | Version of packet base format |
| Management class | 1 byte | Subnet management class value |

TABLE 1-continued

Packet Fields Using Node Identifier to Reference Paths

| OBJECT | LENGTH | DESCRIPTION |
|---|---|---|
| Class version | 1 byte | Version field |
| R | 1 bit | Request/ response field |
| Method | 7 bits | Method of subnet management |
| D | 1 bit | Correction of packet, if zero outbound, if one inbound |
| Status | 15 bits | Status of method |
| Hop pointer | 1 byte | Indicates current position in path field |
| Hop count | 1 byte | Number of valid bytes in the path. Maximum number of route hops |
| Transaction ID | 8 bytes | Transaction specific identifier |
| Attribute ID | 2 bytes | Data objects that are composite structures consisting of registers in subnet nodes. Attributes can be read or written (get/set). Discovery process uses the attribute ID and attribute modifier to read and/or modify specific registers within a given node ID and attribute modifier |
| Reserved 1 | 16 bits | Reserve period set to all zeros |
| Attribute modifier | 4 bytes | An index value to further specify data to be obtained or modified. If not used, set to all zeros. |
| M key | 8 bytes | Used for subnet management authentication |
| DrSLID | 2 bytes | Local identifier of route source |
| DrDLID | 2 bytes | Local identifier of route destination |
| PortPathBlock | 28 bytes | Aligns data field on a 65 byte boundary set to all zeros. Each byte represents a port. |
| Data | 64 bytes | Contains methods attribute. |
| ID PathBlock | 112 bytes | List of node identifier entries. |
| Reserve 2 | 16 bytes | Reserve set to all zeros. |

TABLE 2

Port Path Block Element

| Component | Access | Length | Description |
|---|---|---|---|
| Inport | RW | 8 | Port that packet came in |
| Outport | RW | 8 | Port the packet goes out |

TABLE 3

Identifier Path Block Element

| Component | Access | Length | Description |
|---|---|---|---|
| Node Identifier | RW | 64 | Node Identifier of the node |

In order for the nodes on the subnet to be aware that this mechanism is being used the management class field must be set to a value indicating a subnet management class using directed route with node identifiers. Thus, the subnet manager formats the packet by inserting this management class and by initializing the port path block and identifier path block to zeros. The port number on which the packet will be sent out is placed in the outport portion of the port path block element and its node identifier is placed in the identifier path block element of the packet. These will be the first entries in the path information and the hop pointer will be set to zero. The hop pointer can be taken as an index into the port path block and the identifier path block tables that directly reference each way point. The hop count will be set appropriately as desired by the subnet manager to the number of hops the packet may traverse over the subnet. The D bit will be set to zero and the DrSLID and DrDLID information will be set as in the existing arrangement. The packet is then submitted to the network in the manner described previously.

The distance that the packet can traverse is only limited by the size of the path field. In the broadcast mode, the hop count can be increased from twelve to sixteen. By using this system the subnet manager can successfully and effectively discover the subnet as well as reach all nodes in a subnet. By using the broadcast mechanism in subnet discovery, the way points are successfully identified by their node identifiers unlike existing methods.

Return paths can be optimized by including additional checks so that the return time of the packet will be reduced as described above in regard to FIG. 12. As seen there, the packet came back from switch sA with the inport as 1 and the outport as 4. This packet traveled through switch sB and then sC and back to switch sA. With prior methods, the overlap of the paths could not be detected until the entire subnet paths were discovered. Switches in the system can optimize path discovery by scanning the identifier path block for its own identifier every time it receives a packet. If it does find its node identifier it knows that the packet came back to it and it can return it back to the subnet manager for further inspection.

Thus, this arrangement provides additional benefits. Since identifiers are used to identify individual nodes, the path discovery is automatic and does not need additional inquiries. This makes the processing for the subnet manager minimal for path discovery. A path once discovered will not be duplicated and hence discovery will be speeded up. The tables that the manager generated during discovery will be less complex since the node identities are known at all times. Further, return paths may be optimized by including additional checks in the switch arrangement. This will cut down the return time of the packet from destination to source as described in regard to FIG. 12.

Figure 13:
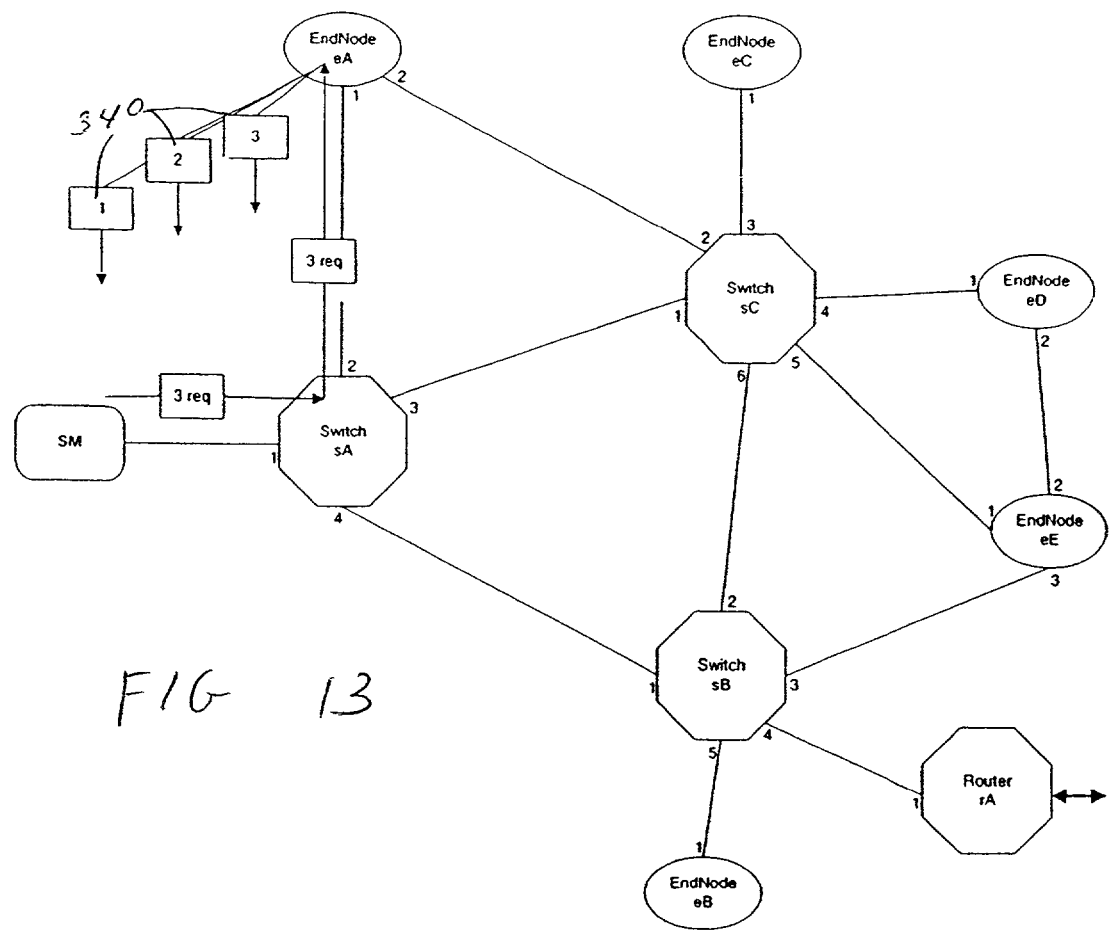
FIG. 13 illustrates an example diagram of the example subnet of FIG. 7 with packets of data having batch requests according to an advantageous arrangement of the present invention.

Another procedure which may be utilized to increase the speed of the discovery process is a batch request mechanism. When a packet is sent around a subnet during a discovery process, it includes particular instructions which are processed by the end nodes that it reaches. These are defined as method and attribute ID fields in the packet. These may describe a job such as GET, SET and so forth as are known in the referenced specifications in the background of the invention. The attribute ID describes the job that is specific to the packet. Some methods like GET will have zero data input in the data area of the packet, with information being added during their response. Since there may be more than one GET request during the discovery process, it is possible to use the attribute ID and attribute modifier fields effectively in order to group these requests together into a batch. In other words, when a packet reaches an end node, instead of asking for a specific detail to be forwarded back to the subnet manager, as shown in FIG. 13, multiple instructions 340 are followed at the same time.

Tables 4 and 5 below indicate some of the information included in such batch requests.

TABLE 4

Batch Request Info

| Component | Settability | Length | Description |
|---|---|---|---|
| BatchBlock | RW | 512 | List of 8 BatchBlock elements. |

TABLE 5

BatchBlock Element

| Component | Access | Length | Description |
|---|---|---|---|
| Attribute ID | RW | 16 | Defines objects being operated on by a management class. If used, set to zero. |
| Attribute Modifier | RW | 32 | Provides further scope to attributes with usage determined by management class. If unused, shall be set to zero. |
| Reserved 1 | RW | 16 | Reserved, set to zero. |

Batch requests can only be used if no processing is required in the data area of the packet. The benefit of batch requests are obtained by the fact that one request can generate more than one reply. This is accomplished by the following procedure.

The management method is set to GET or any other method that does not require processing at the end node. The attribute ID is set to a value that maps to one other reserved values. This may be vendor specific. The attribute modifier holds the total number of requests batched or denotes the total number of requests that are included. The data section is then used to hold a collection of individual attribute ID and attribute modifier values. The batch request info maps individual requests as BatchBlock elements. There can be a maximum of 10 BatchBlock elements in a batch request info. Other fields are then filled as applicable to the packets. It is then submitted to the subnet to be delivered to end nodes.

When the packets are received at a switch and the switch is merely a way point, it forwards the packet and no additional processing is necessary. If the switch is the destination, it looks up the attribute ID to check for the specific reserve field that defines the batch process. If the value is set for batch processing, it looks up the batch request info in the data area and processes the individual BatchBlock elements and takes actions accordingly as it should for the packet that has attribute ID and attribute modifier as contained in the BatchBlock element. The attribute modifier field contains the total number of batch requests. It is also possible to keep processing at end nodes to a minimum by processing the requests at the switch if it is a WAY point. The switch can break down the batch request to individual requests before sending it to the end node. This aids in optimizing the time of the process.

At the end node, the processing will proceed as described above for a switch. The batch process is simple to implement and does not require any complex change.

Utilizing this system benefits the discovery process in that one packet can generate up to ten replies from a single end node. Thus, it saves on subnet bandwidth usage. By processing the batch request at a switch before being delivered to the end node, the processing in the nodes is minimized. The batch request mechanism can be used effectively to distribute requests and diagnostic and vendor specific requests in a quick and efficient manner.

By using a combination of the broadcast mechanism and the batch request, an entire subnet may be discovered with a single packet. Thus, in the subnet shown in FIG. 7, one request can generate sixty six replies that are enough to complete the subnet discovery process for the subnet manager.

Numerous additional modifications and variations of the present invention are possible in light of the above teachings. It is therefore to be understood that within the scope of the appended claims, the invention may be practiced otherwise than as specifically described herein.

The invention claimed is:

1. A method of discovering topology of a subnet fabric, comprising:
   providing a plurality of elements in a subnet fabric, said elements including switches, endnodes, and a subnet manager;
   issuing a packet from said subnet manager to a first switch connected thereto, said packet including a batch request for recovering a plurality of information from each endnode which receives said packet;
   reissuing a packet from said first switch to every element connected thereto;
   repeating said reissuing from every switch which receives a packet until all elements and all paths therebetween have received at least one packet; and
   issuing a return packet from an endnode in response to a packet.

2. The method according to claim 1, wherein each switch receiving a packet copies the incoming packet after adding the port number at which the packet is received.

3. The method according to claim 2, wherein the port number through which the copied packet is to be issued is added before issuing.

4. The method according to claim 1, wherein said return packets return along the same path as originally sent unless a switch through which it passes has received an earlier packet.

5. The method according to claim 1, wherein every element and every port therein are identified by number and a list is made in every packet of all elements and ports through which said packet passes.

6. The method according to claim 1, wherein said packet contains a maximum hop count and a hop pointer indicating if said maximum hop count has been reached.

7. The method according to claim 1, wherein a switch receiving a packet which has passed therethrough before will issue a return packet.

8. The method according to claim 1, wherein node identification numbers identify nodes of said subnet fabric so that path discovery is automatic.

9. A method of discovering topology of a subnet fabric, comprising:
   providing a plurality of elements in a subnet fabric, said elements including switches, endnodes, and a subnet manager;
   assigning a unique identifier to each element and each port thereof in said subnet fabric;
   determining a directed route packet using said identifiers; and
   issuing said packet from said subnet manager to determine all paths in said subnet fabric, wherein said packet is issued using a broadcast method and is also issued using a batch request.

10. A method of performing jobs on endnodes of a subnet fabric, comprising:
    providing a plurality of elements in a subnet fabric, said elements including switches, endnodes, and a subnet manager;
    issuing a packet from said subnet manager to said endnodes through said switches;
    said packet containing a plurality of job requests in a batch request, each job request performing a job on each endnode reached;

each endnode issuing a return signal for each job performed which returns to said subnet manager.

11. The method according to claim 10, wherein said jobs are get jobs and set jobs.

12. The method according to claim 10, further comprising the use of a broadcast mechanism with batch requests.

* * * * *

UNITED STATES PATENT AND TRADEMARK OFFICE
CERTIFICATE OF CORRECTION

PATENT NO. : 7,023,811 B2 Page 1 of 1
APPLICATION NO. : 09/760661
DATED : April 4, 2006
INVENTOR(S) : Pinto It is certified that error appears in the above-identified patent and that said Letters Patent is hereby corrected as shown below:

On the face page, in field (56), under "Other Publications", in column 2, line 4, delete "vol." and insert - - Vol. - -, therefor.

On the face page, in field (56), under "Other Publications", in column 2, line 7, delete "vol." and insert - - Vol. - -, therefor.

On the face page, in field (57), under "Abstract", in column 2, lines 6-7, delete "end nodes" and insert - - endnodes - -, therefor.

In column 16, line 66, in Claim 10, delete "ajob" and insert - - a job - -, therefor.

Signed and Sealed this

Fifteenth Day of August, 2006

JON W. DUDAS
*Director of the United States Patent and Trademark Office*